US011092179B2

(12) United States Patent
Banno

(10) Patent No.: US 11,092,179 B2
(45) Date of Patent: Aug. 17, 2021

(54) CLIP

(71) Applicant: NIFCO INC., Yokosuka (JP)

(72) Inventor: Yoshikazu Banno, Yokosuka (JP)

(73) Assignee: NIFCO INC., Yokosuka (JP)

( * ) Notice: Subject to any disclaimer, the term of this patent is extended or adjusted under 35 U.S.C. 154(b) by 573 days.

(21) Appl. No.: 16/060,102

(22) PCT Filed: Dec. 5, 2016

(86) PCT No.: PCT/JP2016/086029
§ 371 (c)(1),
(2) Date: Jun. 7, 2018

(87) PCT Pub. No.: WO2017/099031
PCT Pub. Date: Jun. 15, 2017

(65) Prior Publication Data
US 2020/0263717 A1    Aug. 20, 2020

(30) Foreign Application Priority Data
Dec. 8, 2015    (JP) .............................. JP2015-239530

(51) Int. Cl.
F16B 19/10    (2006.01)
F16B 5/06    (2006.01)
F16B 21/08    (2006.01)

(52) U.S. Cl.
CPC ........ F16B 5/0664 (2013.01); F16B 19/1081 (2013.01); F16B 21/086 (2013.01)

(58) Field of Classification Search
CPC ............................ F16B 19/1081; F16B 13/063
(Continued)

(56) References Cited

U.S. PATENT DOCUMENTS 3,875,843 A * 4/1975 Maeda ................ F16B 19/1081
411/548
4,872,087 A * 10/1989 Brant ..................... H01H 83/04
361/658
(Continued)

FOREIGN PATENT DOCUMENTS

CN    1961157 A    5/2007
EP    0348258 A1    12/1989
(Continued)

OTHER PUBLICATIONS

PCT/ISA/210, "International Search Report for International Application No. PCT/JP2016/086029," dated Feb. 21, 2017.
(Continued)

*Primary Examiner* — Flemming Saether
(74) *Attorney, Agent, or Firm* — Manabu Kanesaka

(57) ABSTRACT

A clip includes a male member including a head portion and a shaft portion; a female member including a locking leg portion forming an insertion hole into which the shaft portion is inserted, and a flange portion provided in an upper periphery of the locking leg portion; and an engagement device restraining the head portion in the flange portion substantially at the same time when the locking leg portion comes to a use state by pushing the shaft portion into the insertion hole. Essential parts are the engagement device formed by a claw portion provided in one of the head portion and the flange portion, and a hole portion provided in the other of the head portion and the flange portion, and engaging the claw portion. The claw portion projects to a piece portion elastically moveable, and one portion of a hole forming portion dividing the hole portion is formed to be elastically moveable through the hole portion.

7 Claims, 10 Drawing Sheets

(58) Field of Classification Search
USPC .................................................. 411/45–48
See application file for complete search history.

(56) References Cited

U.S. PATENT DOCUMENTS

| | | | | |
|---|---|---|---|---|
| 5,577,779 | A * | 11/1996 | Dangel | ................... E05C 19/06 220/326 |
| 5,775,860 | A * | 7/1998 | Meyer | ................. F16B 19/1081 411/41 |
| 7,374,200 | B2 * | 5/2008 | Ikeda | .................... B60R 21/213 280/728.2 |
| 7,841,817 | B2 * | 11/2010 | Kawai | ................. F16B 19/1081 411/45 |
| 8,695,177 | B2 * | 4/2014 | Kato | .................... F16B 21/065 24/297 |
| 9,004,415 | B2 * | 4/2015 | Fukumoto | ................ F16B 2/14 248/71 |
| 9,115,743 | B2 | 8/2015 | Yamamoto | |
| 9,592,786 | B2 * | 3/2017 | Yamamoto | ............ B60R 21/213 |
| 2004/0091334 | A1 | 5/2004 | Hoshi | |
| 2006/0066080 | A1 | 3/2006 | Ikeda et al. | |
| 2010/0162534 | A1 | 7/2010 | Kato | |
| 2010/0232903 | A1 * | 9/2010 | Nakamura | .......... F16B 19/1081 411/212 |
| 2011/0017742 | A1 * | 1/2011 | Sausen | ............... B60H 1/00528 220/324 |

FOREIGN PATENT DOCUMENTS

| | | |
|---|---|---|
| EP | 2204589 A1 | 7/2010 |
| EP | 2722534 A1 | 4/2014 |
| JP | H07-110021 A | 4/1995 |
| JP | 2004-156722 A | 6/2004 |
| JP | 2006-088985 A | 4/2006 |
| JP | 2008-075696 A | 4/2008 |
| JP | 2008-095880 A | 4/2008 |
| JP | 2014-238109 A | 12/2014 |
| JP | 2016/086029 | 2/2017 |

OTHER PUBLICATIONS

China Patent Office, "Office Action for Chinese Patent Application No. 201680071369.9," dated Apr. 26, 2019.
Europe Patent Office, "Search Report for European Patent Application No. 16872929.1," dated Jul. 5, 2019.

* cited by examiner

CLIP

FIELD OF TECHNOLOGY

The present invention relates to a clip with a two-piece type.

BACKGROUND ART

FIGS. 9(a) and 9(b) show a clip comprising a male member 11 and a female member 15, disclosed in Patent Document 1. The male member 11 includes a head portion 12 and a shaft portion (a fitting shaft) 13 provided below the head portion, and there is formed a locking flange portion 14 on a periphery of the head portion 12. The female member 15 includes a locking leg portion 17 forming an insertion hole (a fitting hole) 18 into which the shaft portion 13 is inserted, and a flange portion 16 provided on an upper-side periphery of the locking leg portion, and there is provided to stand a wall portion 19 projecting a locking claw 23 on an inner wall on an upper face of the flange portion 16. Then, in the clip, as shown in FIG. 9(b), substantially at the same time when the locking leg portion 17 comes to a use state or an actual fastened state by pushing the shaft portion into the insertion hole 18, the locking claw 23 of the wall portion engages the locking flange portion 14 so as to restrain the male member 11 to become impossible to be pulled out.

FIGS. 10(a) to 10(c) show a clip disclosed in Patent Document 2, and a clip main member 20 corresponds to the female member, and an insertion portion 30 corresponds to the male member. The insertion portion 30 includes a head portion (a flange portion) 34 and a shaft portion (an insertion pin) 31 provided below the head portion. The clip main member 20 includes both vertical plate portions 22a and 22b; a bottom plate portion 23 connecting both vertical plate portions; an insertion hole (an inserting hole) into which the shaft portion 31 formed in the bottom plate portion 23 is inserted; a pair of flexible pieces 21a provided below the bottom plate portion 23; and engagement claws 40a and 40b provided on both vertical plate portions. Then, in the clip, as shown in FIGS. 10(b) and 10(c), substantially at the same time when both flexible pieces 21a come to a use state or an actual fastened state by pushing the shaft portion 31 into the insertion hole, the engagement claws 40a and 40b engage the head portion 34 so as to restrain the insertion portion 30 to become impossible to be pulled out.

PRIOR ART DOCUMENTS

Patent Documents

Patent Document 1: Japanese Unexamined Patent Application Publication No. H07-110021
Patent Document 2: Japanese Unexamined Patent Application Publication No. 2007-225092

SUMMARY OF THE INVENTION

Problems to be Solved by the Invention

In the structures of the aforementioned respective documents, in the use state wherein the shaft portion of the male member (the insertion portion) is pushed into the insertion hole of the female member (the clip main member), i.e., the actual fastened state, in the Patent Document 1, the locking flange portion on a male member side engages the locking claw 23 on a female member side, and in the Patent Document 2, the head portion 34 on an insertion portion side engages the engagement claws 40a and 40b on a clip main member side so as to restrain the male member or the insertion portion to become impossible to be pulled out. Consequently, in the respective clip structures, even if a vibration or an impact in a pulling-out direction is applied, the male member is difficult to be detached from the female member so as to maintain a stable attachment state. Consequently, as for an application, for example, when the respective clip structures are used for attaching a component to an automotive body panel and the like on a vehicle-body lower side or near a tire, the clip structures become preferable to a condition in which there is a possibility such that the male member may come out of the female member by an impact thereof due to a flying stone and the like while a vehicle is running.

However, in the structures of the respective Patent Documents, when an engagement or a restraining force increases, a pushing-in operation force of the male member relative to the female member proportionately increases as well, so that a strong force is required so as to deteriorate an operation efficiency. In this regard, in a case wherein an operation is carried out in a narrow place, it will become a serious problem further.

In view of the aforementioned circumstances, an object of the present invention is to maintain excellent workability by weakening the pushing-in operation force more or less even in a case wherein the engagement or the restraining force increases. Other objects of the present invention will be clarified in the following explanation of contents.

Means for Solving the Problems

In order to obtain the aforementioned objects, a clip of the present invention comprises a male member including a head portion and a shaft portion provided below the head portion; a female member including a locking leg portion forming an insertion hole into which the shaft portion is inserted, and a flange portion provided on an upper-side periphery of the locking leg portion; and an engagement device restraining the head portion onto the flange portion substantially at the same time when the locking leg portion comes to a use state by pushing the shaft portion into the insertion hole. Also, the engagement device is formed by a claw portion provided in one of the head portion and the flange portion; and a hole portion provided in the other of the head portion and the flange portion to engage the claw portion, and the engagement device projects a claw portion 14 to a piece portion 13 which is elastically moveable, and forms one portion of a hole forming portion defining the hole portion so as to be elastically moveable through the hole portion.

In the aforementioned clip, the "claw portion" includes a plurality of structures as well other than a single structure. The "hole portion" is not limited to a through hole, and includes a concave-shaped hole as well. Also, the clip of the subject is used in a case wherein a single second member or a plurality of second members is mounted on a first member, or members are combined with each other in a superposed state. Especially, even in a condition of receiving a vibration, an impact, or the like in the use state wherein the male member is pushed into the insertion hole of the female member, the clip of the present invention is a type preferable for a case wherein the male member is intended to be reliably prevented from unexpectedly coming out of the female member by the engagement device. The present invention is devised such that even if an engaging force of the engagement device thereof increases, as for pushing-in operability of the male member relative to the female member, i.e., an engaging operation force, an operation can be carried out with a weak force, and once the male member engages the female member, the male member is difficult to come out of the female member.

The aforementioned present invention may be embodied as described in the following specified aspects.

(A) A structure wherein a piece portion of the head portion elastically moves through a slit passing through up and down, the flange portion includes a periphery wall housing the head portion, and the periphery wall forms the hole portion to pass through approximately horizontally. In this aspect, the head portion is housed in the periphery wall of the flange portion, so that it is difficult to receive an influence of external force, and additionally, the hole portion engaging the claw portion passes through the periphery wall in a horizontal direction, or the piece portion of the head portion elastically moves through the slit passing through up and down, so that the claw portion becomes difficult to be disengaged after the claw portion elastically engages the hole portion, and conflicting requirements of weakening the engaging operation force and increasing the engaging force can be fulfilled.

(B) A structure wherein the piece portion of the head portion projects approximately in parallel to the shaft portion, the flange portion includes the periphery wall housing the head portion, and the hole portion is formed to pass through up and down inside the periphery wall. In this aspect, the head portion is housed in the periphery wall of the flange portion so as to be difficult to receive the influence of external force, and the claw portion and the hole portion are not limited to the structure of the aspect in (A) so as to increase the degree of freedom of designing.

(C) A structure wherein the locking leg portion has a cylinder shape with a bottom closing a tip, and includes an attachment locking piece divided by an approximately U-shaped slit so as to be expandable and retractable in a radial direction, and the locking piece is formed so as to become impossible to reduce a diameter by pushing the shaft portion into the insertion hole. In the aspect, compared to the structures of the Patent Documents 1 and 2, for example, the locking leg portion has the cylinder shape with the bottom closing the tip, so that, for example, in a condition used on a vehicle-body lower side, even if an external force such as a flying stone or the like is applied, the influence becomes difficult to be received so as to obtain a high quality.

(D) A structure of including a temporary fastening device (for example, a combination of a claw and a locking hole) temporarily assembling the male member to the female member; a guide device (for example, a combination of a groove and a rib) guiding when the shaft portion is pushed into a cylinder of the locking leg portion; and a press-connecting device (for example, the claw portion of the shaft portion) pressing to contact when the shaft portion is pushed into the cylinder of the locking leg portion. In this aspect, the structure includes the temporary fastening device temporarily assembling the male member to the female member so as to excel in a handling property; the guide device guiding when the shaft portion is pushed into the cylinder of the locking leg portion so as to excel in assembling operability; and the press-connecting device pressing to contact when the shaft portion is pushed into the cylinder of the locking leg portion so as to increase a connecting force of both members.

Effect of the Invention

In the present invention, the engagement device provided between the head portion on a male member side and the flange portion on a female member side is formed by the claw portion and the hole portion. The claw portion projects to the piece portion which is elastically moveable, and one portion of the hole forming portion defining the hole portion is formed so as to be elastically moveable through the hole portion. Also, the engagement device is formed by the claw portion and the hole portion. The claw portion projects to the piece portion which is elastically moveable, and one portion of the hole forming portion defining the hole portion is formed so as to be elastically moveable through the slit. Therefore, in the engagement device of the present invention, in a process wherein the claw portion and the hole portion engage, due to an elastic movement of the piece portion projecting the claw portion, and an elastic movement of one portion of the hole forming portion, an engaging operation can be carried out with a relatively weak force, and after the engagement, an engagement release is difficult, i.e., the male member becomes difficult to come out of the female member. Thereby, the present invention can maintain excellent workability even in a case of increasing the engaging force by the engagement device.

BRIEF DESCRIPTION OF THE DRAWINGS

FIGS. 2(a) and 2(b) show the clip in a temporary assembly state, wherein FIG. 2(a) is a top view; and FIG. 2(b) is a cross-sectional view taken along a line A-A in FIG. 2(a).

FIGS. 3(a) and 3(b) are drawings for explaining a use operation of the clip, wherein FIG. 3(a) is a cross-sectional view and a partially enlarged view thereof in a middle of pressing a male member by inserting the male member into respective attachment holes of a panel and an attached member in the temporary assembly state of the clip; and FIG. 3(b) is a cross-sectional view in a use state or an actual fastened state wherein the male member is engaged and press-connected to the female member.

FIGS. 4(a), 4(b), 4(c), 4(d), and 4(e) show the aforementioned male member as a single item, wherein FIG. 4(a) is a top view; FIG. 4(b) is a front view; FIG. 4(c) is a right side view; FIG. 4(d) is a bottom view; and FIG. 4(e) is a cross-sectional view taken along a line B-B in FIG. 4(a).

FIGS. 5(a), 5(b), 5(c), 5(d), and 5(e) show the aforementioned female member as a single item, wherein FIG. 5(a) is a top view; FIG. 5(b) is a front view; FIG. 5(c) is a right side view; FIG. 5(d) is a bottom view; and FIG. 5(e) is a cross-sectional view taken along a line C-C in FIG. 5(a).

FIGS. 7(a) and 7(b) show a third modified example of the aforementioned embodiment, wherein FIG. 7(a) is a top view in a state wherein the male member is temporarily assembled to the female member; and FIG. 7(b) is a half cross-sectional view taken along a line D-D in FIG. 7(a).

BEST MODES OF CARRYING OUT THE INVENTION

Figure 1:
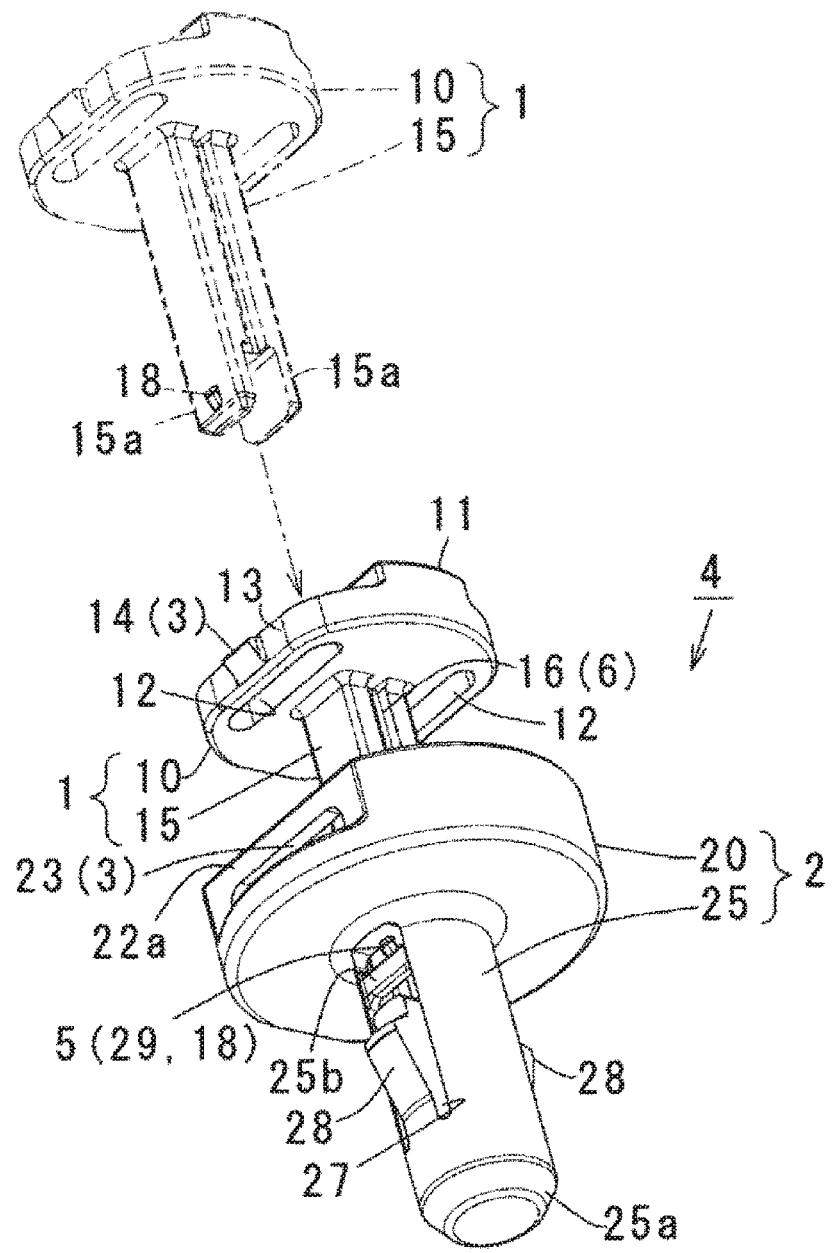
FIG. 1 is a drawing of an external appearance of a clip of one embodiment shown in a state wherein a male member is temporarily assembled to a female member according to the present invention.

Hereinafter, an embodiment and modified examples of the present invention will be explained with reference to the drawings. In the explanation, after a structure of a clip is described in detail, main operations are clarified, and lastly, the first modified example of FIGS. 6(a) and 6(b) and a third modified example of FIGS. 7(a) and 7(b) and FIG. 8 will be referred. Incidentally, a size of the clip is arbitrary; however, the clip is shown by enlarging the size in the drawings so as to be easily understood.

(Structure) A clip 4 of the embodiment is the same as a conventional clip in respect of that the clip 4 of the embodiment comprises a resin male member 1 including a head portion 10 and a shaft portion 15 provided below the head portion; a resin female member 2 including a locking leg portion 25 forming an insertion hole 24 into which the shaft portion 15 is inserted, and a flange portion 20 provided on an upper-side periphery of the locking leg portion; and an engagement device 3 which can restrain the head portion 10 in the flange portion 20 substantially at the same time when the locking leg portion 25 comes to a use state or an actual fastened state by pushing the shaft portion 15 into the insertion hole 24. Device especially resides in a structure of the engagement device 3; a shape of the locking leg portion 25; a structure of a temporary fastening device 5 temporarily assembling the male member 1 to the female member 2, and the like. Hereinafter, details of the aforementioned structures will be clarified.

First, in the male member 1, as shown in FIG. 1 and FIGS. 4(a) to 4(e), the head portion 10 has an approximately rectangular shape, and the shaft portion 15 is provided to project at a center of a lower face of the head portion in an approximately rectangular column shape. In the head portion 10, both sides on an upper face are lowered by one step than an intermediate portion 11, and the head portion 10 includes slits 12 passing through up and down at the aforementioned lowered portions; elastically moveable piece portions 13 divided between a periphery portion and the slits 12; and claw portions 14 provided to project on an outer face (the outer face is one portion of the periphery portion forming the head portion) of the piece portions 13. The respective slits 12 have a straight groove shape, and can elastically move the piece portions 13. The respective claw portions 14 include inclined faces 14a gradually increasing a projecting amount as a projecting end face goes from the bottom to the top.

Figure 3A:
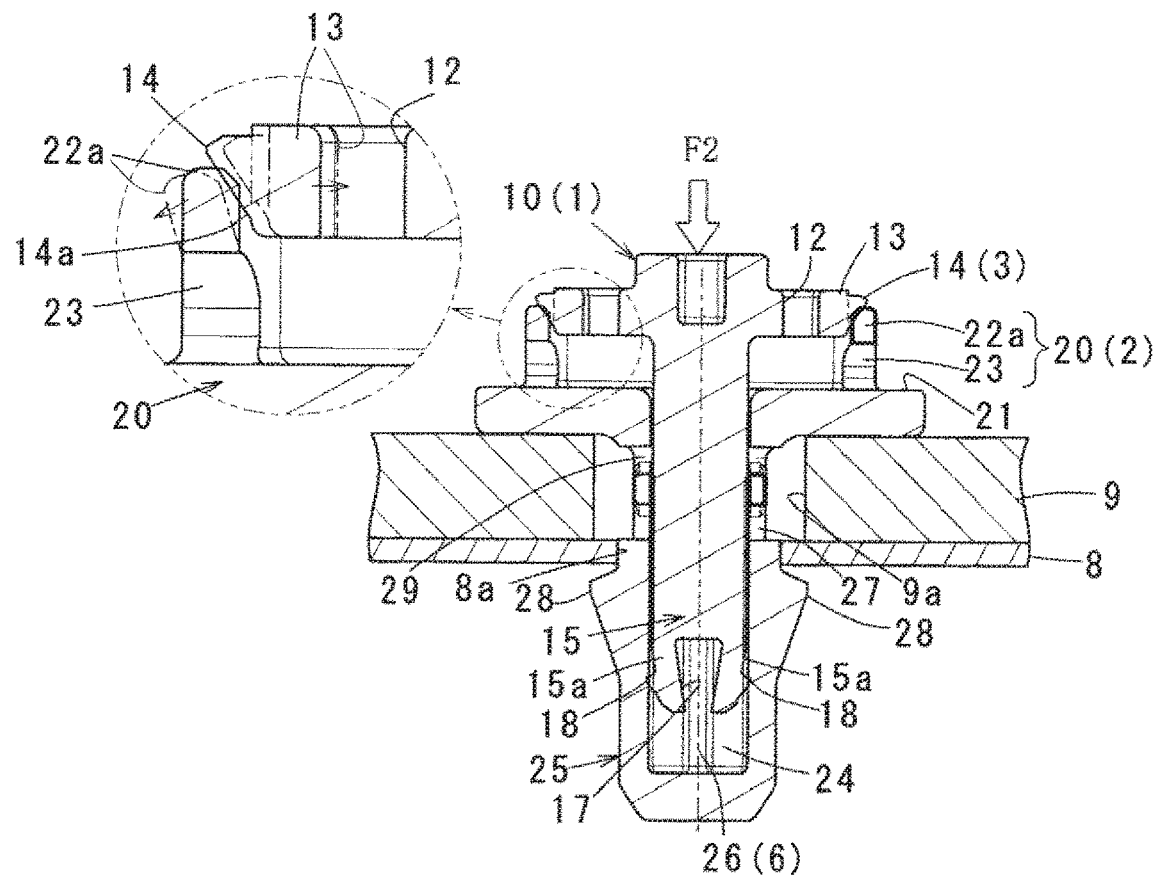
Figure 3B:
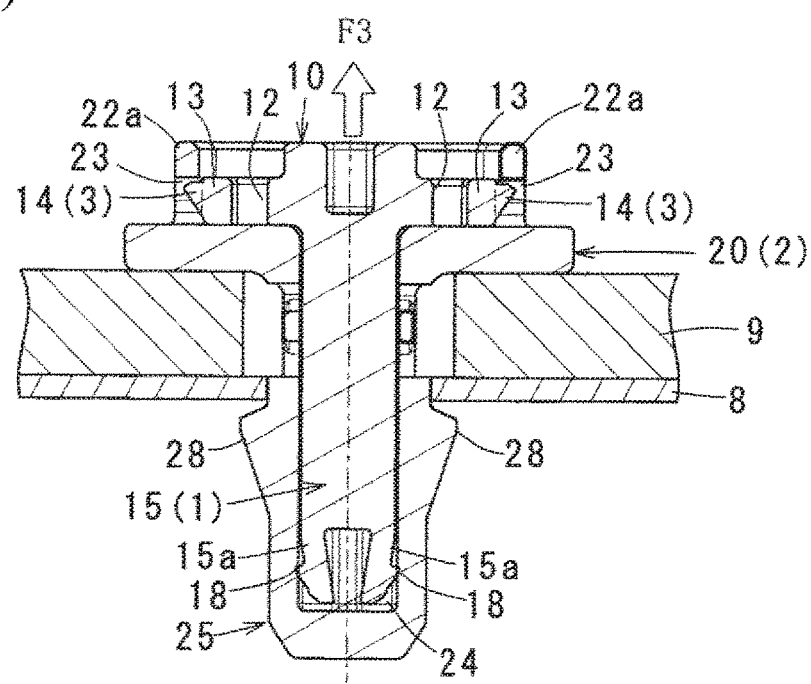
Figure 4A:
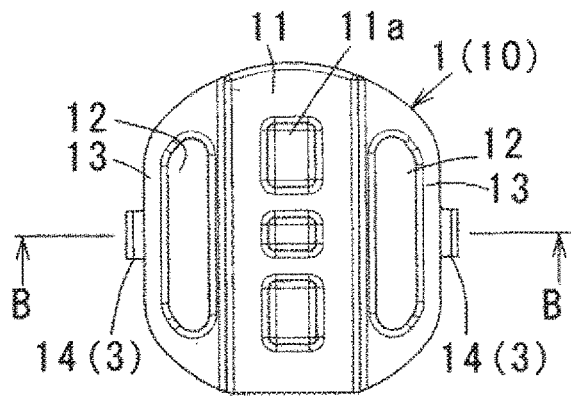
Figure 4B:
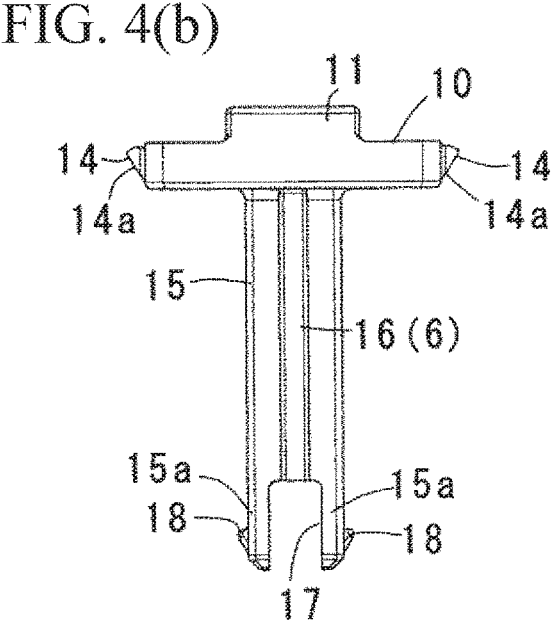
Figure 4C:
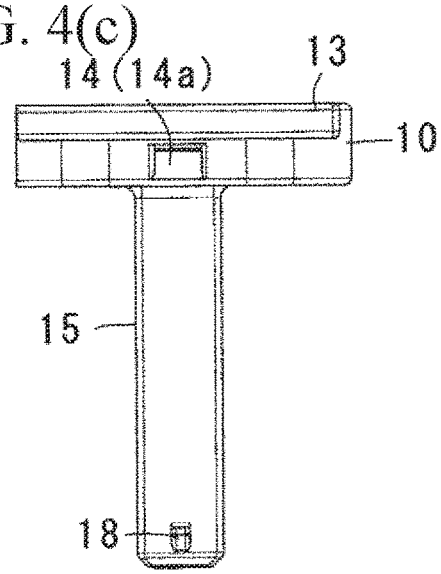
Figure 4D:
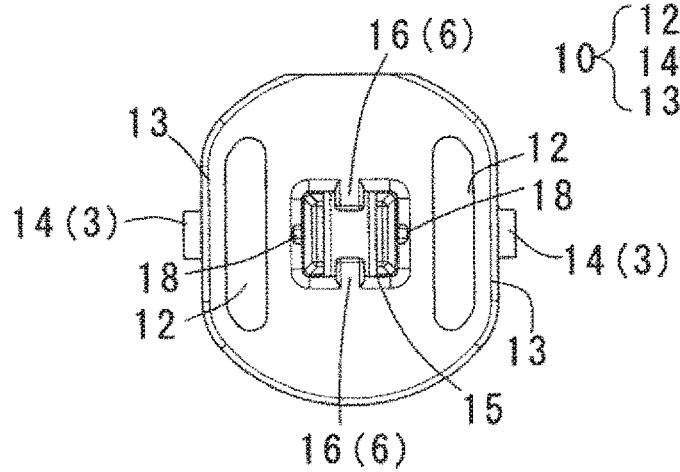
Figure 4E:
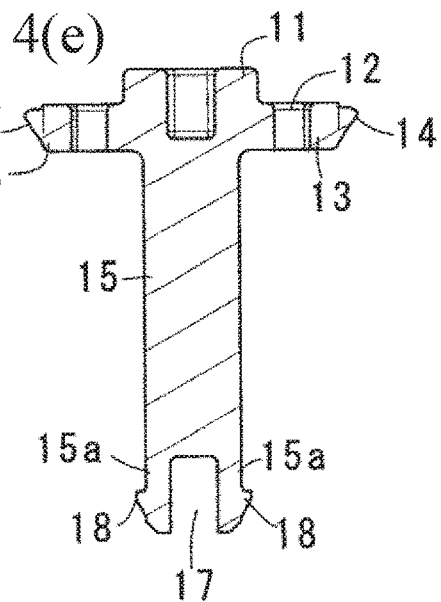
Figure 5A:
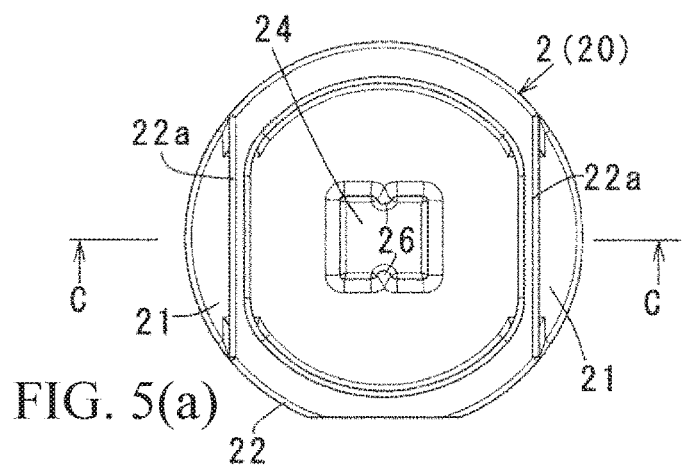
Figure 5B:
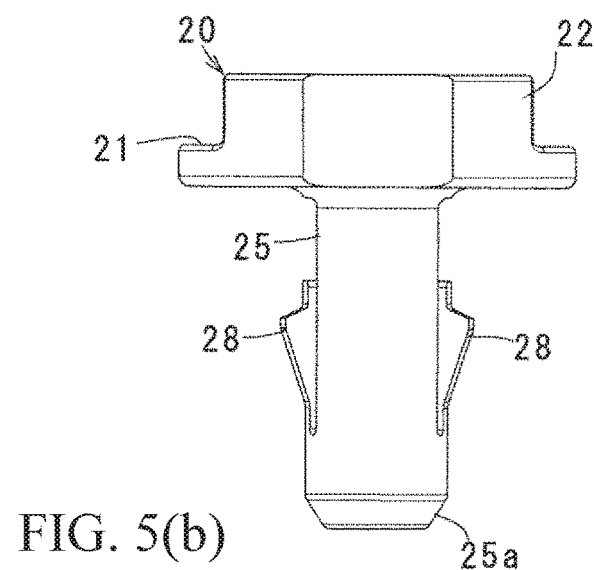
Figure 5C:
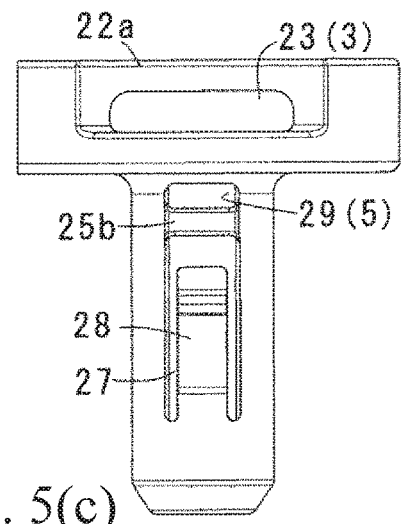
Figure 5D:
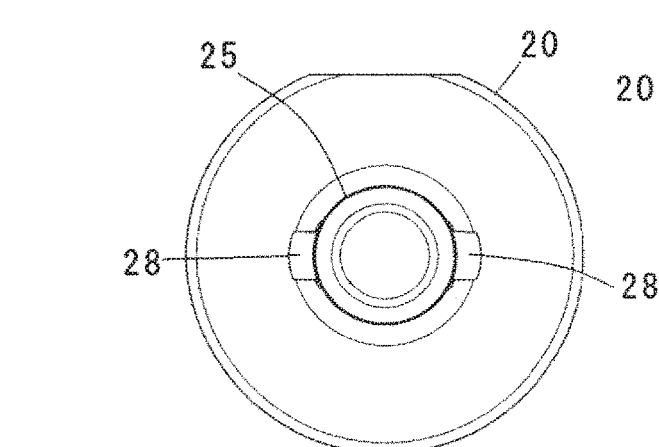
Figure 5E:
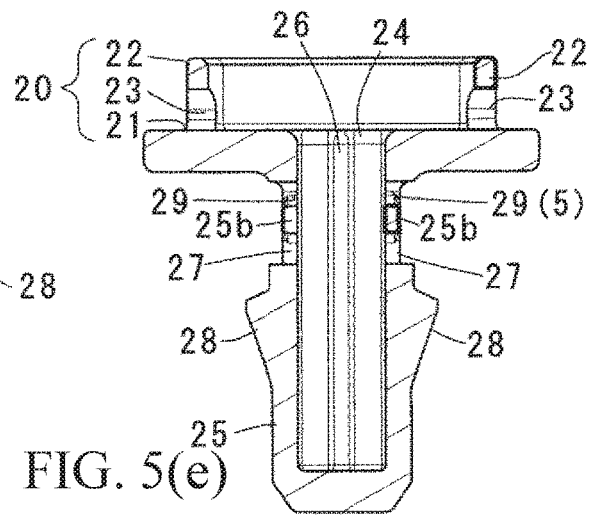

The shaft portion 15 includes grooves 16 located on facing front and back faces and extending in an up-and-down direction; an opening 17 in which an intermediate portion on a tip side is notched up to a tip from slightly just in front of the tip; elastic piece portions 15a and 15a forming between both side faces of the opening 17; and projections 18 provided to project on the side faces on the tip side of the respective piece portions 15a. The respective grooves 16 are positioned at a middle on the front and back faces, and extend straight up to the opening 17 from a lower end of the head portion 10. The opening 17 has a size corresponding to an elastic degree of each piece portion 15a. As shown in FIGS. 3(a) and 3(b), the respective piece portions 15a and projections 18 are elastically displaced when the shaft portion 15 is pushed into a cylinder of the locking leg portion 25 so as to press-connect relative to an inner face of the insertion hole 24 by a predetermined contact pressure, i.e., form a press-connecting device. Also, the projection 18 is formed in such a way so as to gradually increase a projecting amount as a projecting end face goes from the bottom to the top as in the case of the claw portion 14, and forms the temporary fastening device 5 together with locking holes 29 of the later-described locking leg portion 25.

On the other hand, as shown in FIG. 1 and FIGS. 5(a) to 5(e), in the female member 2, the flange portion 20 includes a periphery wall 22 housing the head portion 10 and has an approximately cylindrical shape with a bottom, and the locking leg portion 25 is provided to project in a cylindrical shape with a bottom, closing a tip at a center on a lower face of the flange portion thereof.

Namely, in the flange portion 20, a center portion opens by the insertion hole 24, and the insertion hole 24 thereof extends up to a cylinder inner bottom face of the locking leg portion 25 with an approximately same inner diameter. In the insertion hole 24, a pair of ribs 26 facing each other projects up to the flange portion 20 and the cylinder inner bottom face of the locking leg portion 25. The respective ribs 26 form a guide device 6 together with the aforementioned grooves 16. In the guide device 6, when the shaft portion 15 is pushed into the insertion hole 24, the respective grooves 16 slidably fit into the corresponding ribs 26, and by a fitting state thereof, a pushing-in operation of the shaft portion 15 is stably carried out.

In the periphery wall 22, there are provided notch portions 21 on both sides notched in an arc shape; and elastically moveable piece portions 22a provided corresponding to both notch portions 21. Each piece portion 22a is horizontally notched at one portion on an inner peripheral side of the periphery wall 22, and can move to be displaced by the presence of hole portions 23 on a lower side formed to pass through the inside and outside of the cylinder. The hole portions 23 form the engagement device 3 together with the aforementioned claw portions 14. In the engagement device 3, when the head portion 10 is housed inside the cylinder of the periphery wall 22, the respective claw portions 14 engage the corresponding hole portions 23 so as to restrain the head portion 10 in the flange portion 20. Namely, the engagement device 3 controls the male member 1 so as not to come out of the female member 2 in the use state or the actual fastened state of the clip 4.

Also, as shown in FIGS. 3(a) and 3(b) as an example, the locking leg portion 25 has a diameter corresponding to attachment holes 8a of a panel 8 and attachment holes 9a of an attached member 9, and includes a pair of locking pieces 28 respectively provided to face each other, and engaging the attachment holes 8a; and a pair of locking holes 29 engaging the aforementioned projections 18. The locking holes 29 and the locking pieces 28 are disposed up and down. The respective locking pieces 28 are divided by approximately U-shaped slits 27, are formed to be retractable/expandable and displaceable (see FIG. 5(c)), and increase a projecting amount as an outer face goes from the bottom to the top, and a vicinity of an upper end becomes a step which can engage the attachment hole 8a. The respective locking holes 29 are provided by maintaining intervals 25b between the locking holes 29 and an approximately U-shaped intermediate portion of the slits 27, and are horizontally long oval holes.

(Operation) Hereinafter, main operation characteristics of the aforementioned clip 4 will be clarified with reference to FIGS. 2(a) and 2(b) and FIGS. 3(a) and 3(b). Incidentally, in FIGS. 2(a) and 2(b) and FIGS. 3(a) and 3(b), the reference numeral 8 represents the lower-side panel of an automobile, and in the panel 8, there are provided the attachment holes 8a. The reference numeral 9 represents an aero-spat as one example of the attached member, and in the aero-spat 9, there are provided the attachment holes 9a to be superimposed on the attachment holes 8a. The aero-spat which is the attached member 9 is a relatively long component for controlling and rectifying air which enters into a vehicle lower side or a wheelhouse to generate a turbulent flow, and ensuring running stability. The aero-spat is mounted on a corresponding panel portion on a car body side by fixing with bolts and nuts, and fixing with a plurality of clips 4.

Therefore, as for the clip 4, it is required such that by one-touch operation, the male member 1 can be pushed into the female member 2 to engage with a relatively weak force, and an engaging force or an extraction force is strengthened as much as possible. FIG. 3(b) shows a state wherein a flying stone wound up from a tire during traveling hits a tip side of the locking leg portion 20 of the female member 2, and a stress F3 in an arrow direction, i.e., an extraction direction is applied to the male member 1.

Figure 2A:
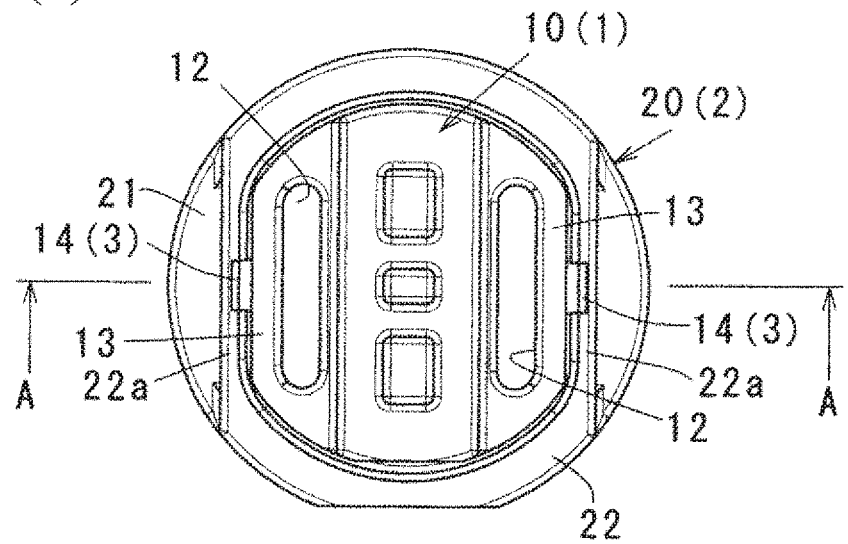
Figure 2B:
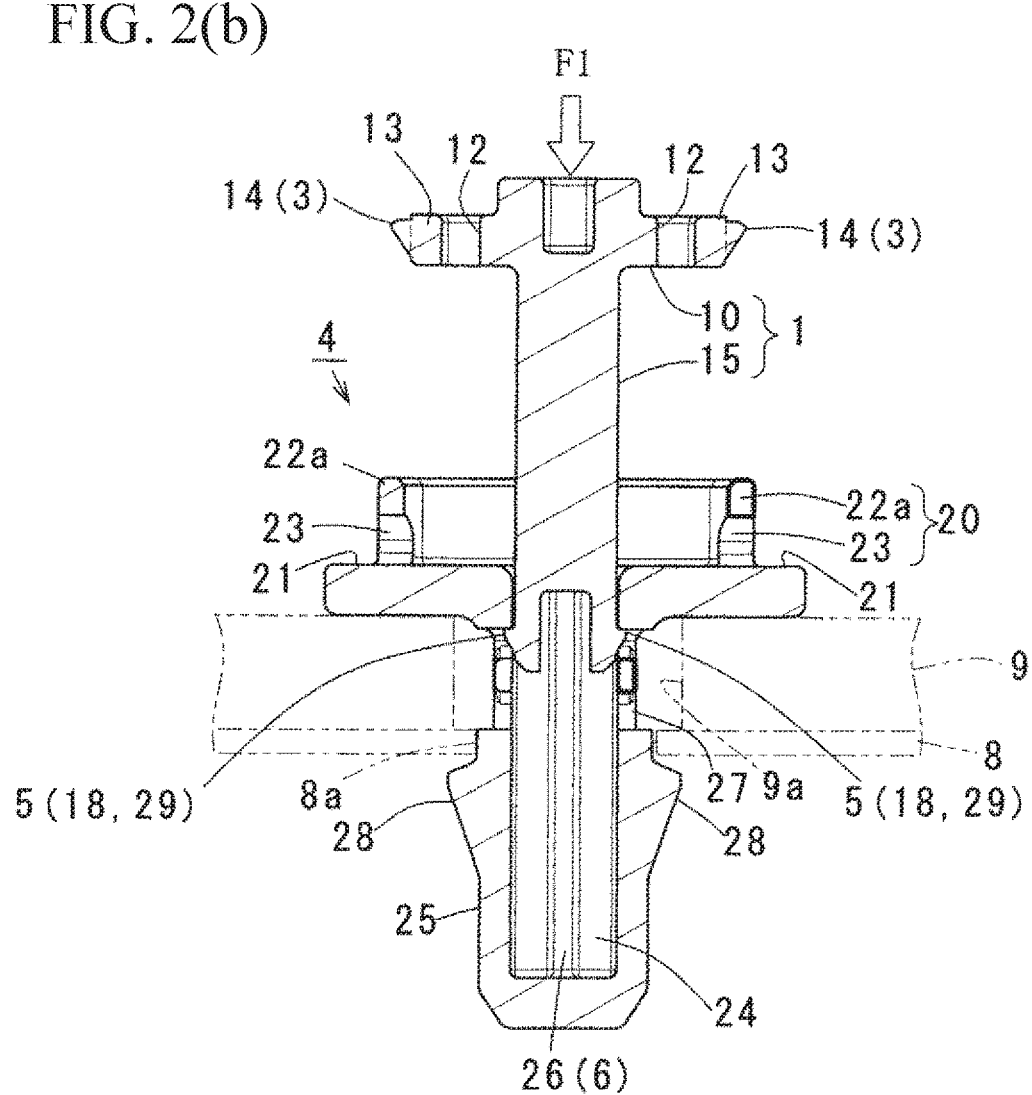

(A) The clip 4 is difficult to handle if the clip 4 is a single item as in the case of the male member 1 in FIGS. 4(a) to 4(e) and the female member 2 in FIGS. 5(a) to 5(e), so that usually, as shown in FIG. 1 and FIGS. 2(a) and 2(b), in a state wherein the male member 1 is temporarily assembled to the female member 2, i.e., a temporary fastened state, the clip 4 is put in an assembly process of the attached member 9. In a temporary fastening operation, as shown in FIGS. 2(a) and 2(b), the male member 1 is pushed downwardly relative to the insertion hole 24 of the female member 2 in a state wherein the male member 1 fits the guide device 6, i.e., the respective grooves 16 into the corresponding ribs 26. Then, the shaft portion 15 slightly enters into the insertion hole 24 accompanied by a diameter reduction displacement of the piece portion 15a, and the piece portion 15a is displaced to expand the diameter to an original shape so as to fit the projection 18 into the locking hole 29. The reference numeral F1 shown in FIG. 2(b) represents a stress pushing the male member 1 downward in the aforementioned manner.

In the aforementioned temporary fastening structure, the male member 1 is stably held relative to the female member 2 in a rising state by fixing between front and back or right and left locking holes 29 and 29 and the projections 18 and 18, and fixing between right and left or front and back ribs 26 and 26 and the grooves 16 and 16, i.e., by fixing of a total of four portions.

(B) FIG. 3(a) shows a state wherein the male member 1 is pushed up to slightly just before the use state or the actual fastened state relative to the insertion hole 24 from the temporary fastened state in FIGS. 2(a) and 2(b). In that case, in the male member 1, the respective piece portions 15a are elastically displaced in a diameter reduction direction by releasing the fitting of the projection 18 relative to the engagement hole 29, and the male member 1 generates a contact pressure accompanied by an elastic displacement thereof. Also, in the engagement device 3, as is apparent from an enlarged view in FIG. 3(a), when each piece portion 22a abuts against the claw portion 14, the piece portion 22a is elastically displaced outwardly which is an arrow direction by a reaction force receiving from the claw portion thereof, and each piece portion 13 is elastically displaced in an arrow direction, i.e., to a slit 12 side by a reaction force receiving from the piece portion 22a through the claw portion 14. By the aforementioned two displacements, as for the engagement device 3, even if an engaging force between the claw portion 14 and the hole portion increases, the engagement device 3 becomes capable of operating to engage by a relatively weak stress F2 (see FIG. 3(a)) in an arrow direction. After the engagement, an engagement release is difficult, i.e., the male member 1 becomes difficult to come out of the female member 2.

Therefore, in the aforementioned clip 4, even in a case wherein an engaging force by the engagement device 3 increases, excellent workability can be maintained. Incidentally, the pushing stress F2 becomes larger for a portion corresponding to the engagement device 3 compared to the stress F1.

(C) FIG. 3(b) shows the use state or the actual fastened state wherein the male member 1 engages the female member 2. In that state, in the male member 1, the projection 18 which is the press-connecting device presses to contact the inner face of the insertion hole 24 in a state wherein a displacement stress is stored in the piece portion 15a, and by a contact pressure thereof and the engaging force by the engagement device 3, the male member 1 is combined relative to the insertion hole 24 of the female member. In an engagement of the engagement device 3, i.e., the claw portion 14 and the hole portion 23, the head portion 10 is housed in the periphery wall 22 of the flange portion, so that it is difficult to receive an influence of external force, for example, the flying stone is difficult to directly hit the head portion 10, and additionally, the hole portion 23 engaging the claw portion 14 passes through the periphery wall 22 in a horizontal direction intersecting the extraction direction of the male member, so that the claw portion 14 becomes difficult to be disengaged after the claw portion 14 elastically engages the hole portion 23.

Therefore, the aforementioned clip 4 can easily fulfill conflicting requirements of weakening an engaging operation force and increasing the extraction force or the engaging force. Obviously, in the aforementioned engagement device 3, there is an advantage that the respective claw portions 14 and piece portions 22a are elastically displaced when the claw portions engage the hole portions 23 so as to obtain a proper moderate feeling.

Figure 6A:
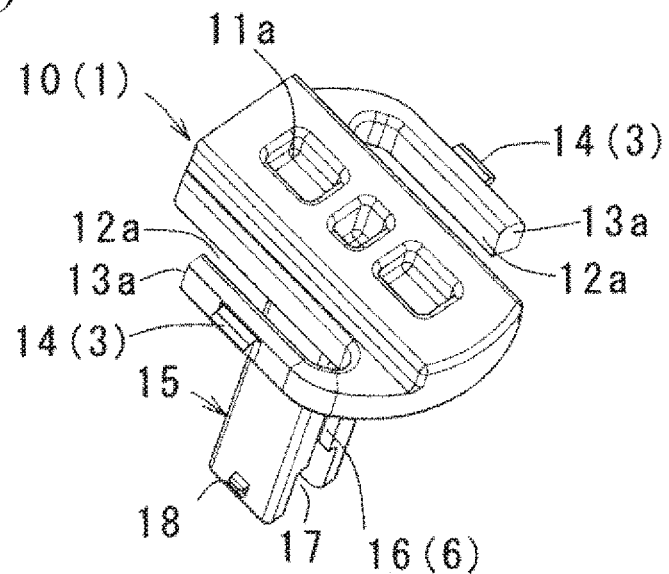
FIG. 6(a) is a perspective view of the male member showing the first modified example of the aforementioned embodiment.
Figure 6B:
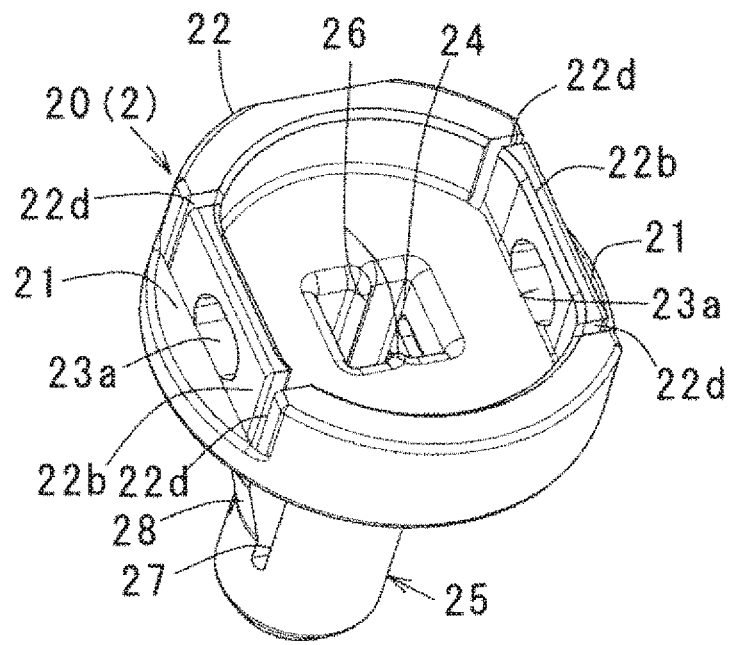
FIG. 6(b) is a perspective view of the female member showing a second modified example of the aforementioned embodiment.
Figure 7A:
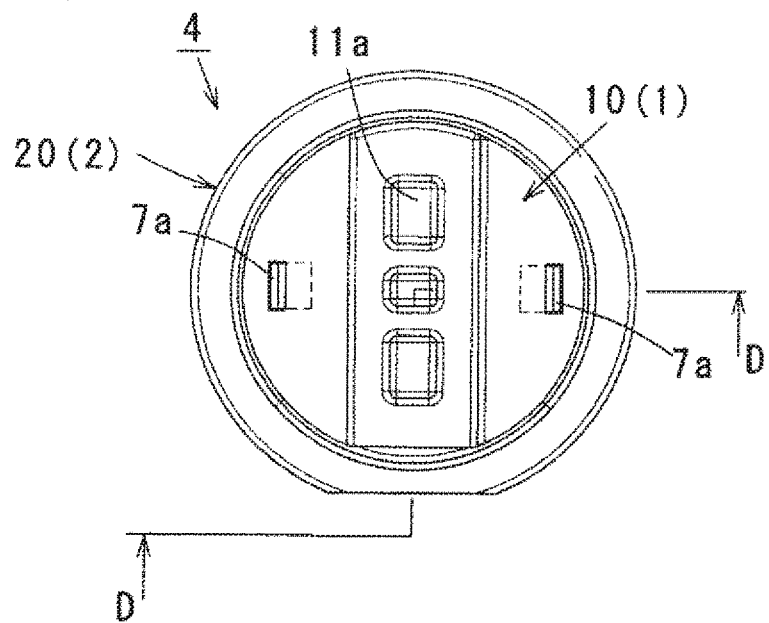
Figure 7B:
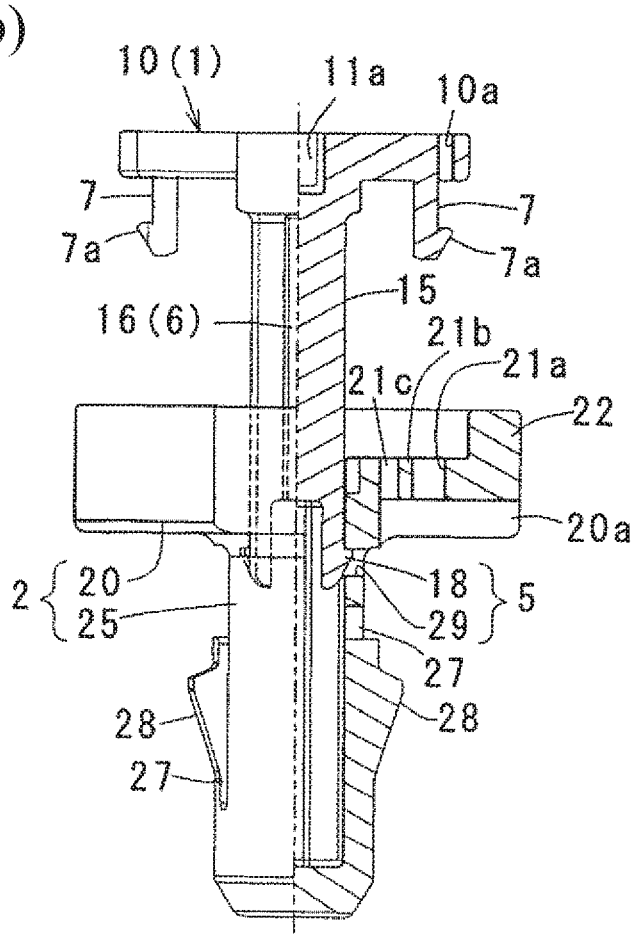
Figure 8:
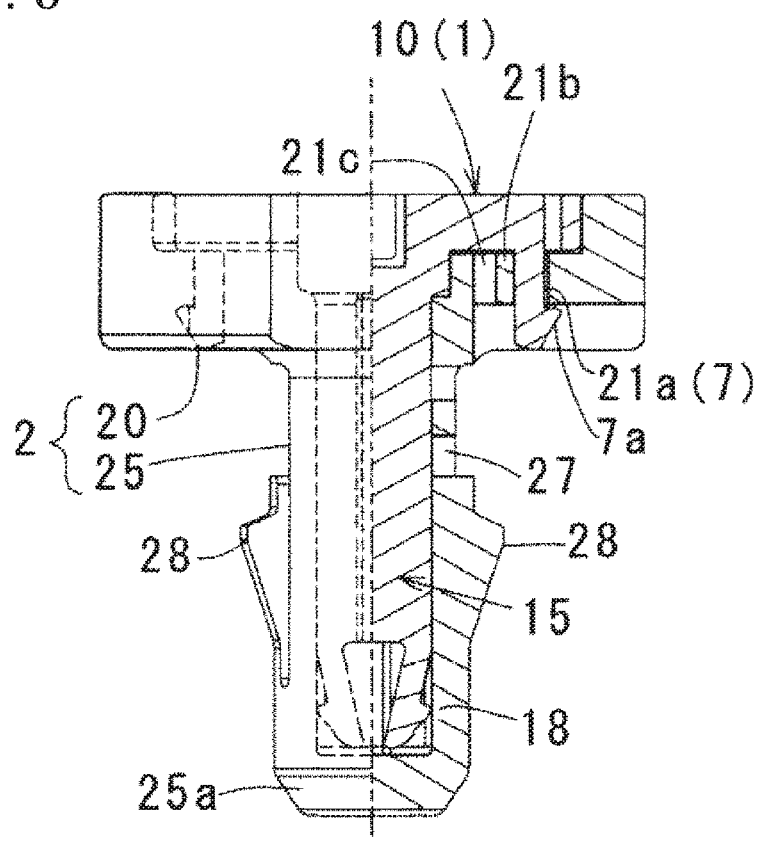
FIG. 8 is a half cross-sectional view showing the aforementioned third modified example in a state wherein the male member is pushed into the female member to become the use state or the actual fastened state.
Figure 9A:
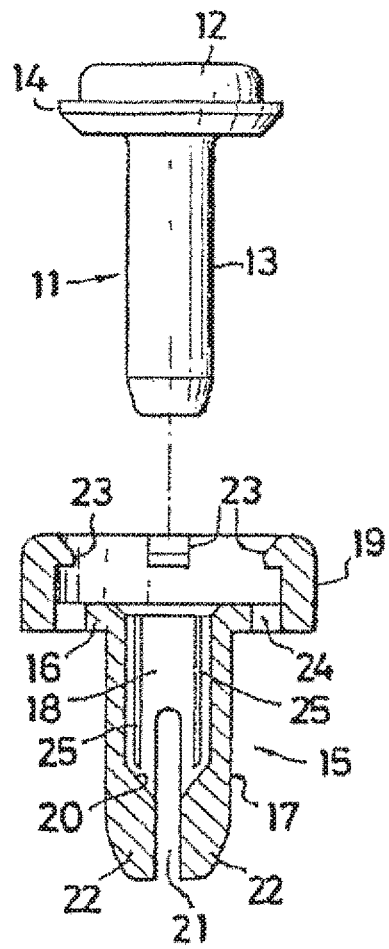
FIGS. 9(a) and 9(b) show a structure of Patent Document 1, and are FIG. 1 and FIG. 4 of the Patent Document 1.
Figure 9B:
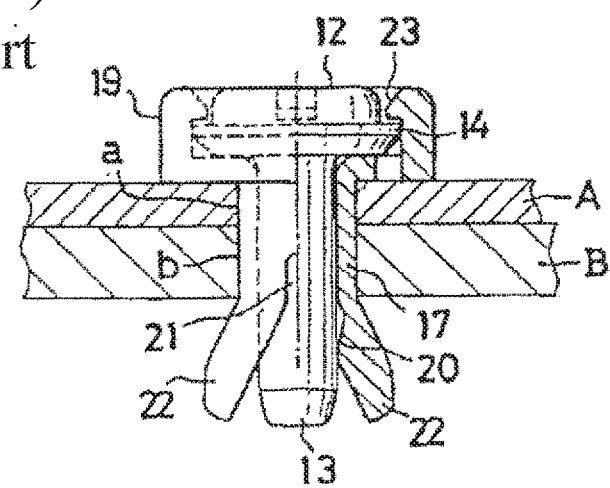
Figure 10A:
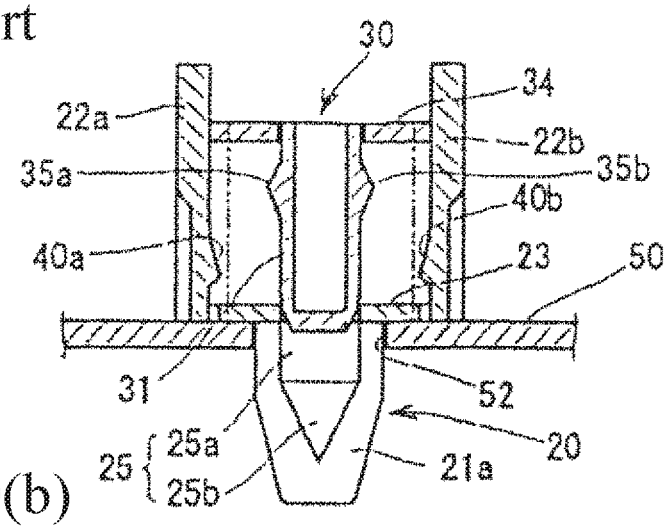
FIGS. 10(a) to 10(c) show a structure of Patent Document 2, and are FIGS. 6(a) to 6(c) of the Patent Document 2.
Figure 10B:
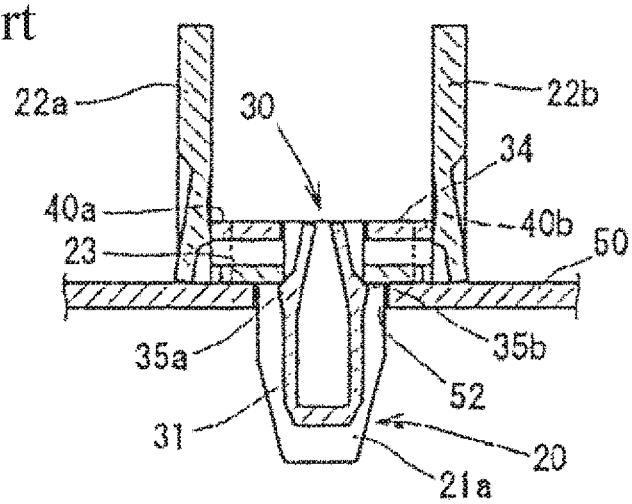
Figure 10C:
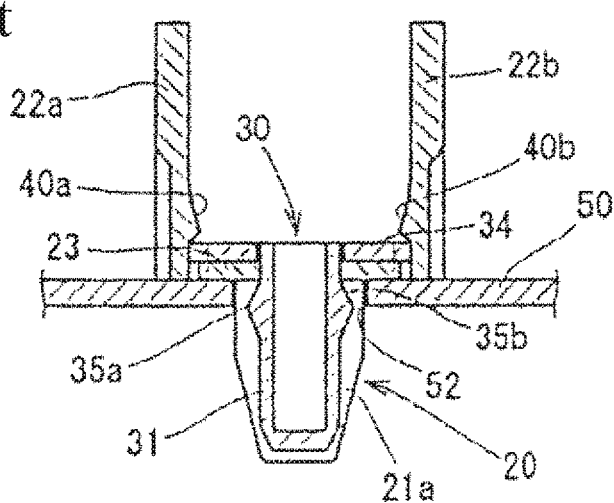

(Modified Examples) The aforementioned clip can be modified as the first and second modified examples in FIGS. 6(a) and 6(b), and the third modified example in FIGS. 7(a) and 7(b), and FIG. 8. In the explanation of each modified example, the same reference signs will be assigned to the members and portions same as those shown in FIG. 1 to FIG. 6(b), and overlapped explanations will be omitted as much as possible.

The first modified example in FIG. 6(a) is one example wherein piece portions 13a are changed to a cantilever type in contrast with a structure wherein both ends of the piece portions 13 of the aforementioned embodiment are integrated with the head portion 10. Namely, in the piece portions 13a, one end is integrated with the head portion 10, and the other end is a free end, so that compared to the piece portion 13, the piece portion 13a has an excellent elastic moving ability.

In the second modified example in FIG. 6(b), the hole portions 23 of the aforementioned embodiment are changed to small fitting holes 23a, and piece portions 22b corresponding to the piece portions 22a of the aforementioned embodiment can elastically move by vertical slits 22d formed on both sides. In that case, a state wherein the claw portion 14 engages the fitting hole 23a can be maintained further stably, and compared to the piece portion 22a, the piece portion 22b has an excellent elastic moving ability.

In the third modified example in FIGS. 7(a) and 7(b), and FIG. 8, the piece portion 22a with the claw portion 14 of the aforementioned embodiment, and the hole portion 23 are changed. Namely, in the third modified example, respective piece portions 7 are provided to project approximately in parallel to the shaft portion 15 from a portion sandwiching the shaft portion 15 on the lower face of the head portion 10, and include claw portions 7*a* on a tip side. The reference sign 10*a* represents a die cutting hole passing through the head portion 10. Also, the flange portion 20 is changed such that the periphery wall 22 is formed low compared to that of the aforementioned embodiment; on the lower face, there are provided relief grooves 20*a* at portions corresponding to the respective piece portions 7; there are provided hole portions 21*a* passing through up and down for passing the piece portions 7 with the claw portions 7*a* through; and portions 21*b* of hole forming portions forming the hole portions 21*a* are partly formed so as to move to be displaced by the presence of slits 21*c*.

In the engagement device 3, from a temporary fastened state in FIG. 7(*b*), when the male member 1 is pushed up to slightly just before the use state or the actual fastened state in FIG. 8 relative to the insertion hole 24, the respective claw portions 7*a* pass the hole portions 21*a* accompanied by deformations of the aforementioned one portions 21*b* to a slits 21*c* side, so that the male member 1 engages the insertion hole 24. In short, the engagement device 3 is not limited to the structures of the aforementioned embodiment or the modified examples 1 and 2, and can increase the degree of freedom of designing.

As mentioned above, in the clip of the present invention, the details can be modified further or developed with reference to the embodiment and the modified examples provided that they comprise the structures specified in the invention. As for one example, in place of the engagement device of the embodiment and the respective modified examples, the piece portion and the claw portion are provided in the flange portion of the female member, and the hole portion engaging the claw portion is provided in the head portion of the male member. Also, as for applications, the clip of the present invention can be applied to various fields other than the embodiment, and the title of the present invention may be called an attachment device and the like as well.

EXPLANATION OF SYMBOLS

1 . . . a male member
2 . . . a female member
3 . . . an engagement device (14 and 7*a* are claw portions, and 23 and 21*a* are hole portions.)
4 . . . a clip
5 . . . a temporary fastening device (18 is claws, and 29 is locking holes.)
6 . . . a guide device (16 is grooves, and 26 is ribs.)
7 . . . piece portions
8 . . . a panel (8*a* is attachment holes.)
9 . . . an attached member (9*a* is attachment holes.)
10 . . . a head portion (12 and 12*a* are slits.)
13 . . . piece portions
13*a* . . . piece portions
15 . . . a shaft portion
15*a* . . . elastic piece portions
18 . . . projections of the piece portions (a press-connecting device)
20 . . . a flange portion
22 . . . a periphery wall
21*a* . . . one portions of hole forming portions
22*a* . . . piece portions (one portions of hole forming portions)
22*b* . . . piece portions (one portions of hole forming portions)
23*a* . . . fitting holes
24 . . . an insertion hole
25 . . . a locking leg portion Incidentally, the specification, claims, drawings, and abstract of Japanese Patent Application No. 2015-239530 filed on Dec. 8, 2015 are cited in their entirety herein and are incorporated as a disclosure of the specification of the present invention.

What is claimed is:

1. A clip, comprising:
   a male member including a head portion, a slit formed in the head portion, an elastically movable first piece portion between a peripheral portion of the head portion and the slit, and a shaft portion provided below the head portion;
   a female member including a locking leg portion having an insertion hole into which the shaft portion is inserted, a flange portion provided on an upper-side periphery of the locking leg portion, a hole portion formed in a periphery wall of the flange portion, and an elastically movable second piece portion formed in the periphery wall and defined by the hole portion; and
   an engagement device restraining the head portion in the flange portion substantially at a same time when the locking leg portion comes to a use state by pushing the shaft portion into the insertion hole,
   wherein the engagement device is formed by a claw portion provided at one of the first piece portion of the head portion and the second piece portion of the flange portion, and a portion provided at another of the second piece portion of the flange portion and the first piece portion of the head portion, and engaging the claw portion, and
   the claw portion projects from the first or second piece portion which is elastically moveable.

2. A clip according to claim 1, wherein the flange portion includes the periphery wall which houses the head portion, and the periphery wall has the hole portion to pass through approximately horizontally.

3. A clip according to claim 1, wherein the first piece portion of the head portion is provided to project approximately in parallel to the shaft portion, the flange portion includes the periphery wall housing the head portion, and the insertion hole is formed to pass through up and down inside the periphery wall.

4. A clip according to claim 1, wherein the locking leg portion has a cylinder shape with a bottom closing a tip, and includes an attachment locking piece divided by an approximately U-shaped slit and expandable and retractable in a radial direction, and the locking piece is formed so as to become impossible to reduce a diameter by pushing the shaft portion into the insertion hole.

5. A clip according to claim 1, further comprising a temporary fastening device temporarily assembling the male member to the female member; a guide device guiding when the shaft portion is pushed into a cylinder of the locking leg portion; and a press-connecting device pressing to contact when the shaft portion is pushed into the cylinder of the locking leg portion.

6. A clip according to claim 1, wherein the hole portion extends horizontally in the peripheral wall of the flange portion.

7. A clip according to claim 1, wherein the claw portion extends outwardly from the first piece portion, and engages the hole portion of the female member when the male member is fully inserted into the female member.

* * * * *